US006901315B2

(12) United States Patent
Köckemann

(10) Patent No.: US 6,901,315 B2
(45) Date of Patent: May 31, 2005

(54) DEVICE FOR CONTROLLING A HYDRAULIC ACTUATOR

(75) Inventor: Albert Köckemann, Lohr am Main (DE)

(73) Assignee: Bosch Rexroth AG, Lohr/Main (DE)

( * ) Notice: Subject to any disclaimer, the term of this patent is extended or adjusted under 35 U.S.C. 154(b) by 22 days.

(21) Appl. No.: 10/221,540

(22) PCT Filed: Feb. 14, 2001

(86) PCT No.: PCT/EP01/01618

§ 371 (c)(1),
(2), (4) Date: Sep. 10, 2002

(87) PCT Pub. No.: WO01/69094

PCT Pub. Date: Sep. 20, 2001

(65) Prior Publication Data

US 2003/0078697 A1 Apr. 24, 2003

(30) Foreign Application Priority Data

Mar. 15, 2000 (DE) ........................................ 100 12 405

(51) Int. Cl.[7] .......................... G05D 7/00; G05B 15/00
(52) U.S. Cl. ...................................... 700/282; 700/275
(58) Field of Search ................................ 700/275, 282; 173/2

(56) References Cited

U.S. PATENT DOCUMENTS

| | | | | | |
|---|---|---|---|---|---|
| 4,807,516 | A | * | 2/1989 | Takats | 91/363 A |
| 5,251,148 | A | * | 10/1993 | Haines et al. | 700/282 |
| 5,422,808 | A | * | 6/1995 | Catanese et al. | 700/79 |
| 5,500,580 | A | * | 3/1996 | Tranovich | 318/568.16 |
| 5,806,565 | A | | 9/1998 | Kadlicko | |
| 6,356,811 | B1 | * | 3/2002 | Beselt | 700/301 |
| 6,442,534 | B1 | * | 8/2002 | Au et al. | 706/1 |
| 2001/0037159 | A1 | * | 11/2001 | Boger et al. | 700/52 |

FOREIGN PATENT DOCUMENTS

| | | |
|---|---|---|
| DE | 4232518 | 3/1994 |
| DE | 4232519 | 3/1994 |
| DE | 4316560 | 11/1994 |
| DE | 19530935 | 2/1997 |
| DE | 29717042 | 11/1997 |
| DE | 19736581 | 4/1998 |
| DE | 29522027 | 4/1999 |

OTHER PUBLICATIONS

Helduser Siegfried: Intelligente Aktuatorsysteme mit serieller Bus–Kommunikation. In :O+P Olhydraulik und Pneumatik 36, 1992, No. 9, pp. 580–588.
RD 30 131–P/10.99 HNC 100 Serie 2X, Mannesmann Rexroth AG.
Faller M: "Proportional Ventile mit Feldbusschnittstelle", Olhydraulic und Pneumatik, Krausskopf Verlag fur Wirtschaft GmbH, Mainz, DE, vol. 43, No. 8, pp. 602–606.
Leutner V et al: "Elektronik in Der Fluidtechnik", Olhydraulik Und Pneumatik, DE, Vereinigte Fachverlage, Mainz, vol. 42, No. 6 pp. (s) 367–368, 370–372.
Bublitz R: "Profil Fluidtechnik–Ein Geraeteprofil Fuer Die Hydraulik" Olhydraulik Und Pneumatik, Krauskope Verlag Fur Wirtschaft GmbH, Mainz, DE, vol. 43, No. 8, p (s). 595–596, 598–601.

* cited by examiner

*Primary Examiner*—Leo Picard
*Assistant Examiner*—Elliot L. Frank
(74) *Attorney, Agent, or Firm*—Martin A. Farber

(57) ABSTRACT

A device for controlling a hydraulic actuator includes an electrically operated valve that controls the flow of a pressure medium in the actuator in response to the operations of three controllers. A first of the controllers designates a position of a piston of the valve. A second of the controllers commands movement of the actuator. And a third of the controllers electronically controls a sequence of movements of the actuator. The three actuators are arranged in a common housing located on the valve.

12 Claims, 3 Drawing Sheets

DEVICE FOR CONTROLLING A HYDRAULIC ACTUATOR

FIELD AND BACKGROUND OF THE INVENTION

The invention relates to a device for controlling a hydraulic actuator, comprising an electrically operated valve which controls the flow of pressure medium to and from the actuator, and comprising a controller, integrated into the housing of the valve or held on the latter in its own housing, for the position of the valve piston.

A device of this type comprising an electrically operated hydraulic valve is disclosed by DE 195 30 935 C2. A displacement sensor for the position of the valve piston converts the position of the valve piston into an electrical signal, which is supplied to a position controller as actual value. The controller for the position of the valve piston is arranged in its own housing, which is held on the housing of the valve. The controller ensures that the valve piston follows a position set point, which is supplied to the controller as an electrical input variable, for example in the form of a voltage. In this case, the position of the valve piston determines the magnitude of the passage cross section of the valve using valves of this type, flow of pressure medium to and from an actuator, for example a hydraulic cylinder, is controlled.

The document RD 30 131-P/10.99 "HNC 100 Series 2X" from Mannesmann Rexroth AG discloses a digital controller subassembly for electromechanical and electrohydraulic drives. Using a controller subassembly of this type, up to two different drives can be controlled independently of each other. The controller subassembly is provided for installation in a switch cabinet. A plurality of these subassemblies are preferably mounted together in a switch cabinet. From the latter there lead electrical signal lines for the transmission of set points to the drive and further signal lines, which are used for the transmission of actual values back from the drive to the controller subassemblies arranged in the switch cabinet. In the case of electrohydraulic drives, the controller subassemblies supply the set point for the position of the valve piston of an electrically operated hydraulic valve, which controls the flow of pressure medium to and from a hydraulic actuator. Various actual values, such as the position of the valve piston or the pressures in the area of the output connections of the valve, are fed back from the drive to the controller subassembly. This leads to an expenditure on circuitry which is not inconsiderable. Added to this is the fact that, because of the large number of electric lines which have to be connected in the switch cabinet, there is the risk of wrong connections during installation and during commissioning.

SUMMARY OF THE INVENTION

The invention is based on the object of providing a device of the type mentioned at the beginning which can be employed cost-effectively in open-loop and closed-loop control systems having a plurality of electrohydraulic drives.

As a result of the integration of the subassemblies for the control of the drive into the hydraulic valve, the expenditure on cabling is reduced, in particular the length of the signal lines from the sensors for the state variables of the drive is shortened. At the same time, the amount of space required in the switch cabinet is reduced, since only space to accommodate the higher-order controller is needed there. Furthermore, it is possible to assemble and pretest the drive for one axis as an entire system. Since only the supply lines have to be connected to said system during installation, for example in a machine tool, the commissioning costs are reduced considerably.

By constructing the electronic controller as a freely programmable sequence controller, high flexibility results. By means of interfaces to a local bus system, to which further devices of identical construction can be connected, the latter can be networked with one another. This networking permits general exchange of data between a plurality of drives, for example in order to implement synchronous running control systems. The local bus system results in an automation concept which can be scaled in modular fashion. Interfaces to a global bus system, for example a fieldbus system, permit communication with higher-order controllers. Fieldbus systems suitable for this purpose are known, for example under the designations PROFIBUS-DB, INTERBUS-S and CAN. The higher-order controller is constructed as a programmable logic controller (PLC) or as a PC. It predefines, for example, the set points of the controlled variables of the movement sequence of the actuator. In the form of lower-order control loops, closed-loop control of the pressure of the pressure medium supplied to the actuator, on its own or in conjunction with closed-control of the quantity of pressure medium supplied to the actuator, is possible. Constructing the controller for the variable that represents the movement of the actuator as a microprocessor-controlled digital controller permits implementation of extremely different algorithms. In this case, a change in the control parameters is possible even during continuous operation. By arranging the components of the interfaces for the bus access coupling on a separate circuit board, which is held on a base circuit board by a plug-in connection, simple adaptation of the device to different bus systems is possible.

BRIEF DESCRIPTION OF THE DRAWINGS

The invention, together with its further details, will be explained in more detail below by using an exemplary embodiment illustrated in the drawings, in which.

DETAILED DESCRIPTION OF THE PREFERRED EMBODIMENT

Figure 1:
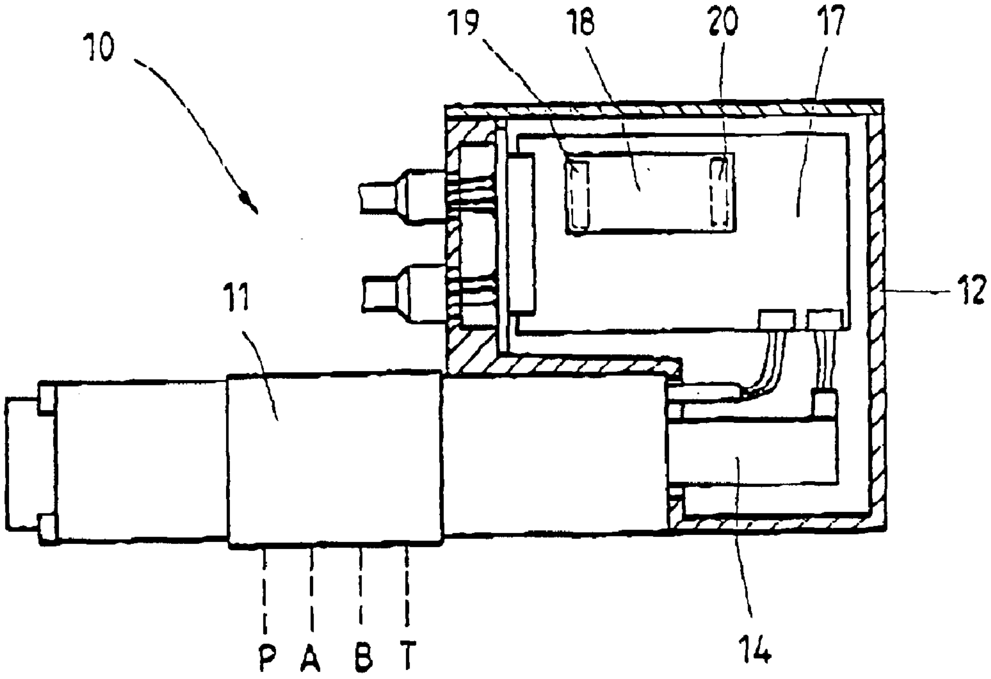
FIG. 1 shows the view of a hydraulic valve with a housing held on the latter to accommodate an electrical circuit, in a partially sectioned illustration.
Figure 2:
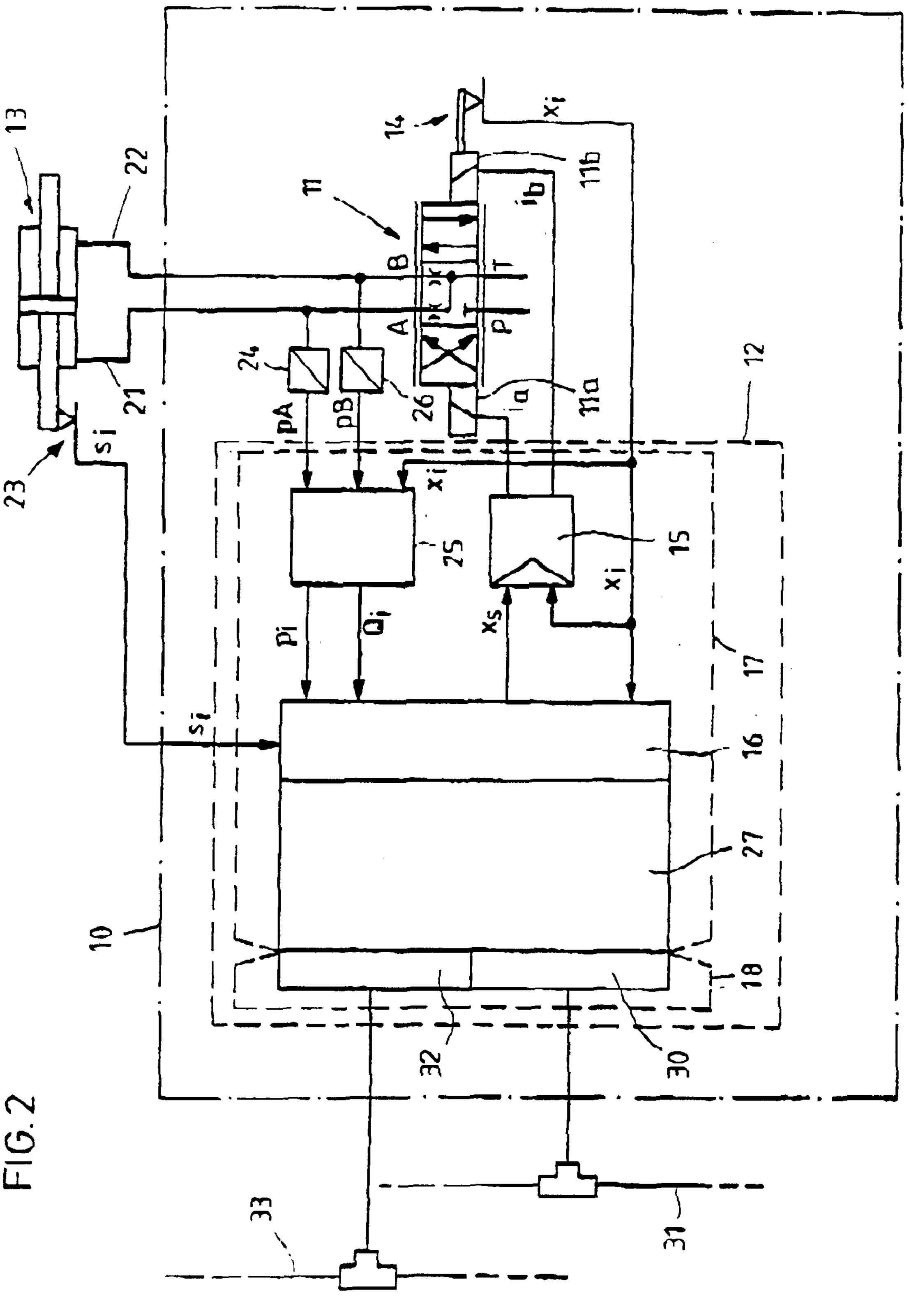
FIG. 2 shows the block circuit diagram of a device according to the invention for controlling a hydraulic actuator, which is connected on the input side to two bus systems and on the output side to a double-ended cylinder
Figure 3:
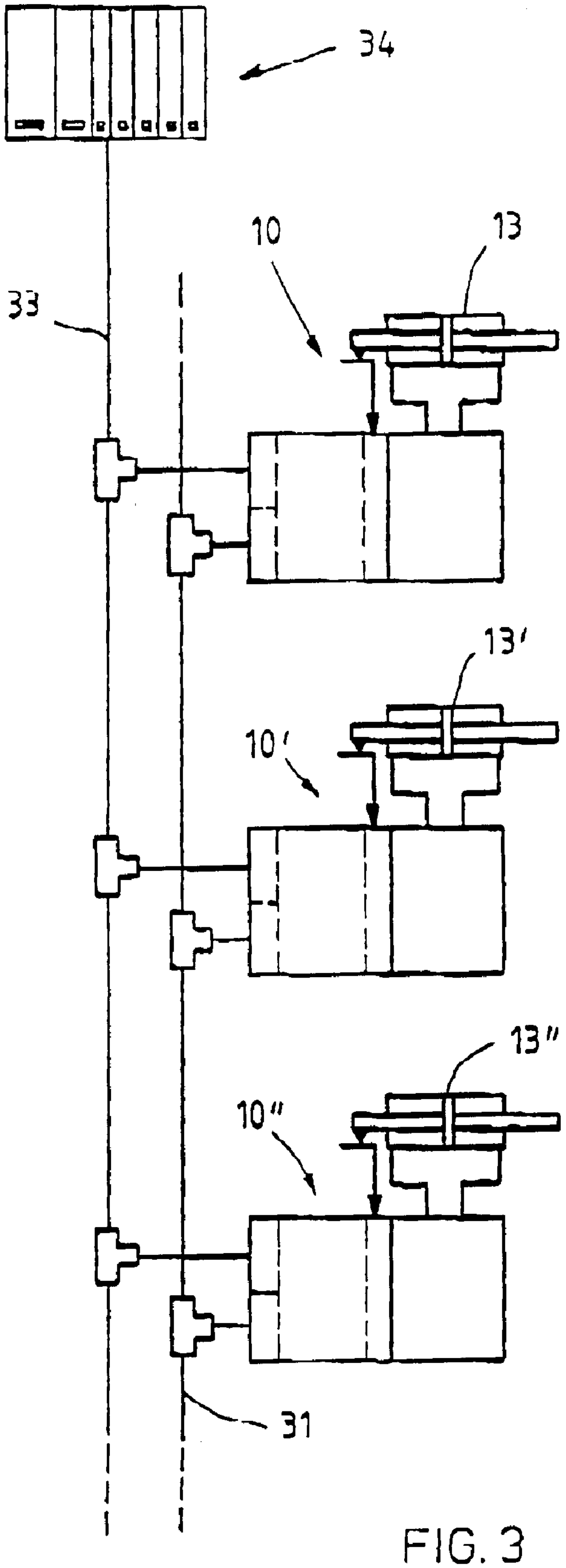
FIG. 3 shows a schematic illustration of three devices according to the invention, which are connected to a local and to a global bus system.

FIG. 1 shows the view of a device 10 for controlling a hydraulic actuator. A housing 12 is held on a hydraulic valve 11. The valve 11 is illustrated as viewed from the side. The valve 11 controls the flow of pressure medium from a pump to a hydraulic actuator and back from the latter to a tank. In the exemplary embodiment, the actuator is a hydraulic cylinder which, in FIGS. 2 and 3, is illustrated as a double-ended cylinder 13. Alternatively, the actuator used may be a differential cylinder or a hydraulic motor. The hydraulic connections of the valve 11 are designated by P for the pump connection, T for the tank connection and A and B for the connections to the double-ended cylinder 13. A displacement sensor 14 for the position x of the valve piston projects into the housing 12. The displacement sensor 14 converts the position x of the valve piston into an electrical signal xi which, in the controller 15 illustrated in FIG. 2, is supplied as the actual value. The components of the controller 15, together with a controller 16, described in more detail below in connection with FIG. 2, for the position s of the piston rod of the double-ended cylinder 13, are arranged on a circuit board 17 which is held in the housing 12. A second circuit board 18 is held on the circuit board 17 via plug-in connections 19 and 20. The plug-in connections 19 and 20 are used both for the electrical connection of conductor tracks on the circuit board 17 to conductor tracks on the circuit board 18 and for the mechanical connection between the circuit boards 17 and 18. As described below using FIGS. 2 and 3, the circuit board 18 carries interfaces via which the device 10 can be coupled to bus systems used for signal transmission. By replacing the circuit board 18, simple adaptation of the device 10 to different bus systems is possible.

FIG. 2 shows the block circuit diagram of the device 10 illustrated in FIG. 1 for controlling the double-ended cylinder 13. In this case, the same designations as in FIG. 1 are used for the same components. The controller 15 for the position x of the valve piston of the valve 11 is supplied with the output signal xi from the displacement sensor 14 as actual value, and a set point xs, as input signals. The output stage of the controller 15 supplies the coils 11*a* and 11*b* of the valve 11 with the currents ia and ib, which serve as actuating variables and deflect the valve piston in accordance with the control deviation and the transfer function of the controller 15 in such a way that the valve piston assumes the position predefined by the signal xs. In order that the actual value of the position of the valve piston follows its set point as quickly as possible, the controller 15 is constructed as an analog controller. The connections A and B of the valve 11 are connected to the double-ended cylinder 13 via hydraulic lines 21 and 22. The piston rod of the double-ended cylinder 13 is provided with a displacement sensor 23, which converts the position of the piston rod into an electrical signal si. The signal si is supplied to the controller 16 as an actual position value. By differentiating the signal xi, the actual value of the speed of the piston rod of the double-ended cylinder 13 is obtained as required for speed control. A pressure sensor 24 registers the pressure in the area of the connection A of the valve 11 and supplies a signal pA corresponding to this pressure to a computing circuit 25. A further pressure sensor 26 registers the pressure in the area of the connection B of the valve 11 and supplies a signal pB corresponding to this pressure to the computing circuit 25. In addition to the signals pA and pB, the computing circuit 25 is supplied with the actual value xi of the position of the valve piston. From the weighted pressure difference between the signals pA and pB, the computing circuit 25 forms an actual pressure value pi, which is also a measure of the force acting on the piston rod of the double-ended cylinder 13. The signal pi is supplied to the controller 16, for example as an actual value of a lower-order pressure control loop. If desired, the computing circuit 24 additionally forms an actual quantity value QI from the signals pA, pB and xi. This signal is supplied to the controller 16 as an actual value from a lower-order quantity control loop. A selection circuit, not specifically illustrated here, ensures that either the pressure control loop or the quantity control loop is active. The controller 16 is constructed as a microprocessor-controlled digital controller. It is therefore capable of processing the algorithms of the pressure or quantity control of the pressure medium supplied to the double-ended cylinder 13, in addition to the algorithms for the position control of the piston rod of the double-ended cylinder 13. Instead of the position control described, speed control, force control or pressure control can also be implemented by the digital controller 16.

The set point used for the controller 16 is the output signal from an electronic controller 27. The controller 27 is a freely programmable sequence controller with NC and/or PLC functionality. In this case, NC is the designation usual in machine control systems for "numeric control", and PLC is the usual designation for "programmable logic controllers". The programming of the sequence controller can be carried out by the user. The independence of the user from the manufacturer at the time of programming results in very great flexibility of the device according to the invention. Above all, however, in this way the process know-how of the user remains protected. The controller 27 has a first interface 30 to a local bus system 31. Further devices 10', 10" for controlling a further double-ended cylinder 13', 13" in each case are connected to this bus system, as illustrated in FIG. 3. The controller 27 has an interface 32 to a global bus system 33, via which the device 10 is connected to a higher-order controller 34 illustrated in FIG. 3. The interfaces 30 and 32 are arranged on the circuit board 18 illustrated in FIG. 1. By replacing the circuit board 18, the device 10 can be connected in a simple way to different bus systems.

FIG. 3 shows a schematic illustration of the device 10 and two further identically constructed devices 10' and 10". On the output side, a double-ended cylinder 13, 13' and 13" respectively are connected to the devices 10, 10', 10". On the input side, the devices 10, 10', 10" are connected to the local bus system 31 and to the global bus system 33. The local bus system 31 is, for example, a CAN bus. It connects the devices 10, 10', 10" and possibly further identical devices—not illustrated here—to one another. It permits the exchange of data between a plurality of drives. Via this data exchange, for example synchronous control systems of the piston rods of the double-ended cylinders 13, 13', 13" can be implemented. The global bus system 33 connects the devices 10, 10', 10" to the higher-order controller 34. It is used for communication between the individual devices 10, 10', 10" and the higher-order controller 34. In FIG. 3, the latter is illustrated as a programmable logic controller PLC, but can also be implemented by a PC. The higher-order controller 34 predefines, for example, the set points of the controlled variables of the movement sequence of the actuator. The controlled variables of the movement sequence of the actuator are, for example, the position s of the piston rod of the double-ended cylinder 13 or its speed or the force acting on the piston rod of the double-ended cylinder 13. Via the global bus system 33, the higher-order controller 34 can be supplied with the different actual values from the drive, such as xi, si, pi, Qi, for example for monitoring purposes.

In FIG. 1, a separate housing 12 is held on the valve 11 in order to accommodate the circuit boards 17 and 18 which carry the electronic circuits. However, it is also possible to construct the housing of the valve in such a way that the circuit boards 17 and 18 carrying the electronic circuits are held directly in the housing of the valve. In this case, it is advantageous to provide dividing walls in the housing of the valve, which prevent pressure medium getting into the area in which the circuit boards are held.

What is claimed is:

1. A device for controlling a hydraulic actuator, comprising an electrically operated valve which controls the flow of pressure medium to and from the actuator, and comprising three controllers that are integrated into a housing of the valve or held on the latter in their own housing, for position of a valve piston, wherein a second of said controllers (16) for a variable (s) representative of movement of the actuator (13), and a third controller (27) of said controllers that is an electronic controller for movement sequence of the actuator (13), are arranged in a common housing (12) with a first of the controllers (15) for the position (x) of the valve piston.

2. The device as claimed in claim 1, wherein the electronic controller (27) is a freely programmable sequence controller with NC and/or PLC functionality.

3. The device as claimed in claim 1, wherein the electronic controller (27) has an interface (30) to a local bus system (31), to which further devices (10', 10") for control of a further actuator (13', 13") in each case is connectable.

4. The device as claimed in claim 1, wherein the electronic controller (27) has an interface (32) to a global bus system (33), via which a device (10) is connectable to a higher-order controller (34).

5. The device as claimed in claim 4, wherein the higher-order controller (34) is a programmable logic controller.

6. The device as claimed in claim 4, wherein the higher-order controller (34) is operated by a PC.

7. The device as claimed in claim 1, wherein the valve (11) is provided with two pressure sensors (24, 26) which register pressures (pA, pB) in an area of output connections (A, B) of the valve (11), wherein the output signals (pA, PB) from the pressure sensors (24, 26) are supplied to a computing circuit (25), which links the signals (pA, PB) supplied thereto to form an actual pressure value (pi) for the pressure control, and the computing circuit (25) is arranged in the same housing (12) as the controller (15) for the position (x) of the valve piston.

8. The device as claimed in claim 7, wherein actual position value (xi) is supplied to the computing circuit (25), and wherein the computing circuit (25) links the signals (pA, pB, xi) supplied thereto to form an actual quantity value (Qi) for control of quantity of the pressure medium.

9. The device as claimed in claim 1, wherein the second controller (16) for the variable (s) representative of the movement of the actuator (13) is constructed as a microprocessor-controlled digital controller.

10. The device as claimed in claim 9, wherein set points (ss) for the controlled variables (s) of the movement sequence of the actuator (13) are settable by digital control signals, which are supplied to the device (10) via a global bus system (33).

11. The device as claimed in claim 3, wherein components of the electronic controller (27) are arranged on a first circuit board (17), wherein components of a bus access coupling (30, 32) are arranged on a further circuit board (18), and wherein the further circuit board (18) is held on the first circuit board (17) via a plug-in connection (19, 20).

12. The device as claimed in claim 4, wherein components of the electronic controller (27) are arranged on a first circuit board (17), wherein components of a bus access coupling (30, 32) are arranged on a further circuit board (18), and wherein the further circuit board (18) is held on the first circuit board (17) via a plug-in connection (19, 20).

* * * * *